(12) United States Patent
Blackmon et al.

(10) Patent No.: US 8,127,087 B2
(45) Date of Patent: Feb. 28, 2012

(54) MEMORY CONTROLLER FOR IMPROVED READ PORT SELECTION IN A MEMORY MIRRORED SYSTEM

(75) Inventors: Herman L. Blackmon, Moline, IL (US);
Joseph A. Kirscht, Rochester, MN (US);
Elizabeth A. McGlone, Rochester, MN (US); Jeb A. Shookman, Milwaukee, WI (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 12/369,806

(22) Filed: Feb. 12, 2009

(65) Prior Publication Data

US 2010/0205383 A1    Aug. 12, 2010

(51) Int. Cl.
*G06F 12/00* (2006.01)
(52) U.S. Cl. .................. 711/149; 711/151; 711/202

(58) Field of Classification Search .................. None
See application file for complete search history.

(56) References Cited

U.S. PATENT DOCUMENTS

| | | | |
|---|---|---|---|
| 2006/0077950 A1* | 4/2006 | Gallagher et al. | 370/351 |
| 2006/0184846 A1* | 8/2006 | Hillier et al. | 714/718 |

* cited by examiner

*Primary Examiner* — Shawn X Gu
(74) *Attorney, Agent, or Firm* — Matthew C. Zehrer

(57) ABSTRACT

Read commands on a mirrored memory computer system are scheduled by utilizing information about pending memory access requests. A conflict queue is configured to track a read/write queue associated with each of a plurality of memory ports on the mirrored memory system. The conflict queue determines a predicted latency on each memory port based on the contents of each of the read/write queues. A compare logic unit is coupled to the conflict queue, wherein the compare logic unit compares a predicted latency of a primary memory and a mirrored memory and schedules read commands to the memory port with the lowest predicted latency.

19 Claims, 6 Drawing Sheets

MEMORY CONTROLLER FOR IMPROVED READ PORT SELECTION IN A MEMORY MIRRORED SYSTEM

BACKGROUND OF THE INVENTION

1. Field of the Invention

This invention relates generally to improving performance of highly reliable computer systems. In particular, read scheduling in a memory mirroring environment is provided.

2. Description of the Related Art

"Memory mirroring" is the practice of creating and maintaining an exact replica of original data on system memory. Memory mirroring has been used in highly reliable systems for years. It requires that a portion of the user's physical memory be allocated as mirrored memory, thus resulting in reduced system memory capacity. In effect, memory mirroring would reduce memory capacity by half. Although memory mirroring offers increased system reliability, the reduction in system memory capacity may generally result in reduced performance. Current techniques for addressing the performance tradeoff are few and inadequate.

One technique for improving performance on mirrored memory systems has been to split memory access requests between a primary memory port and a mirrored (secondary) memory port. In a mirrored memory system, write requests are executed by both a primary memory port and a secondary memory port. In contrast, read requests need only be executed by either the primary port or the secondary port. When all read requests are dispatched to the primary port, the read bandwidth of the secondary memory port goes unused. In an effort to reclaim the wasted bandwidth, prior mirrored memory computer system have used a "toggle" mode, alternating between the primary and secondary port, to direct each read request to the opposite port to which the previous read request was directed. Although the "toggle" method is a definite improvement over directing all reads to the primary port, there are still significant drawbacks.

Therefore, there is a need for a mirrored memory system that schedules read commands such that both overall memory latency is reduced and read bandwidth on the mirrored memory port is utilized.

SUMMARY OF THE INVENTION

The present invention provides for the scheduling of read commands on a mirrored memory system by utilizing information about in-flight and pending memory access requests. A conflict queue is configured to track commands associated with each of a plurality of memory ports on the mirrored memory system. The conflict queue determines a predicted latency on each memory port based on the commands associated with each of the plurality of memory ports. A compare logic unit is coupled to the conflict queue, wherein the compare logic unit compares a predicted latency of a primary memory and a mirrored memory and schedules read commands to the memory port with the lowest predicted latency.

DETAILED DESCRIPTION OF THE PREFERRED EMBODIMENTS

In the following detailed description of embodiments of the invention, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
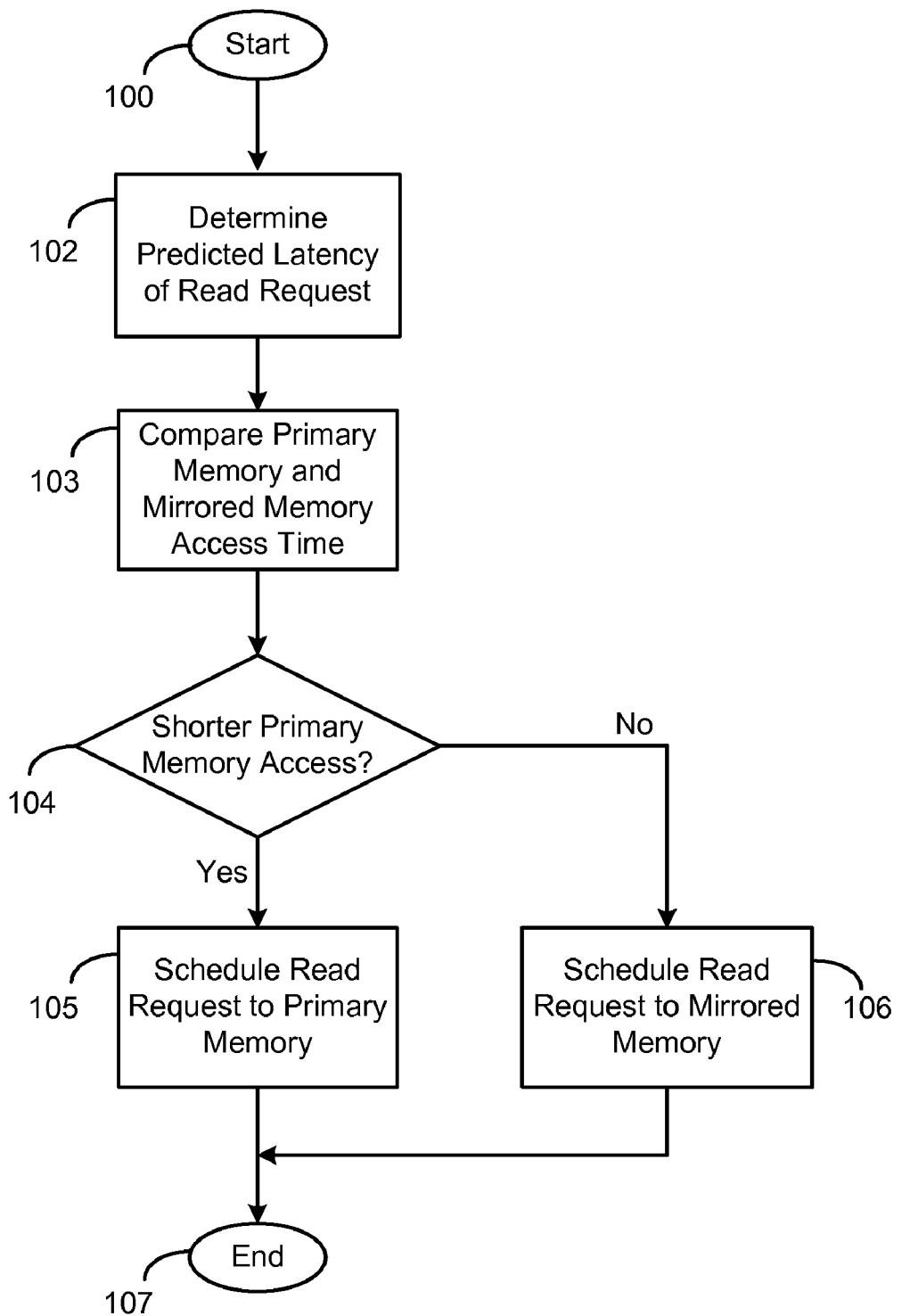
FIG. 1 is a method embodiment of a system that assigns read memory commands between a primary memory and a mirrored memory based on shortest predicted latency.

FIG. 1 is a flow chart 100 illustrating in general the process of a system that assigns read memory commands between a primary memory and a mirrored memory. In step 102, the system determines a predicted latency of a read command on the primary memory and the mirrored memory. In step 103, the system compares the predicted latency of the read command on the primary memory and the mirrored memory to determine if primary memory has a shorter access time. If YES, the system in block 104 schedules the read command to the primary memory 105. If NO, the system in block 104 schedules the read command to mirrored memory 106.

Figure 2A:
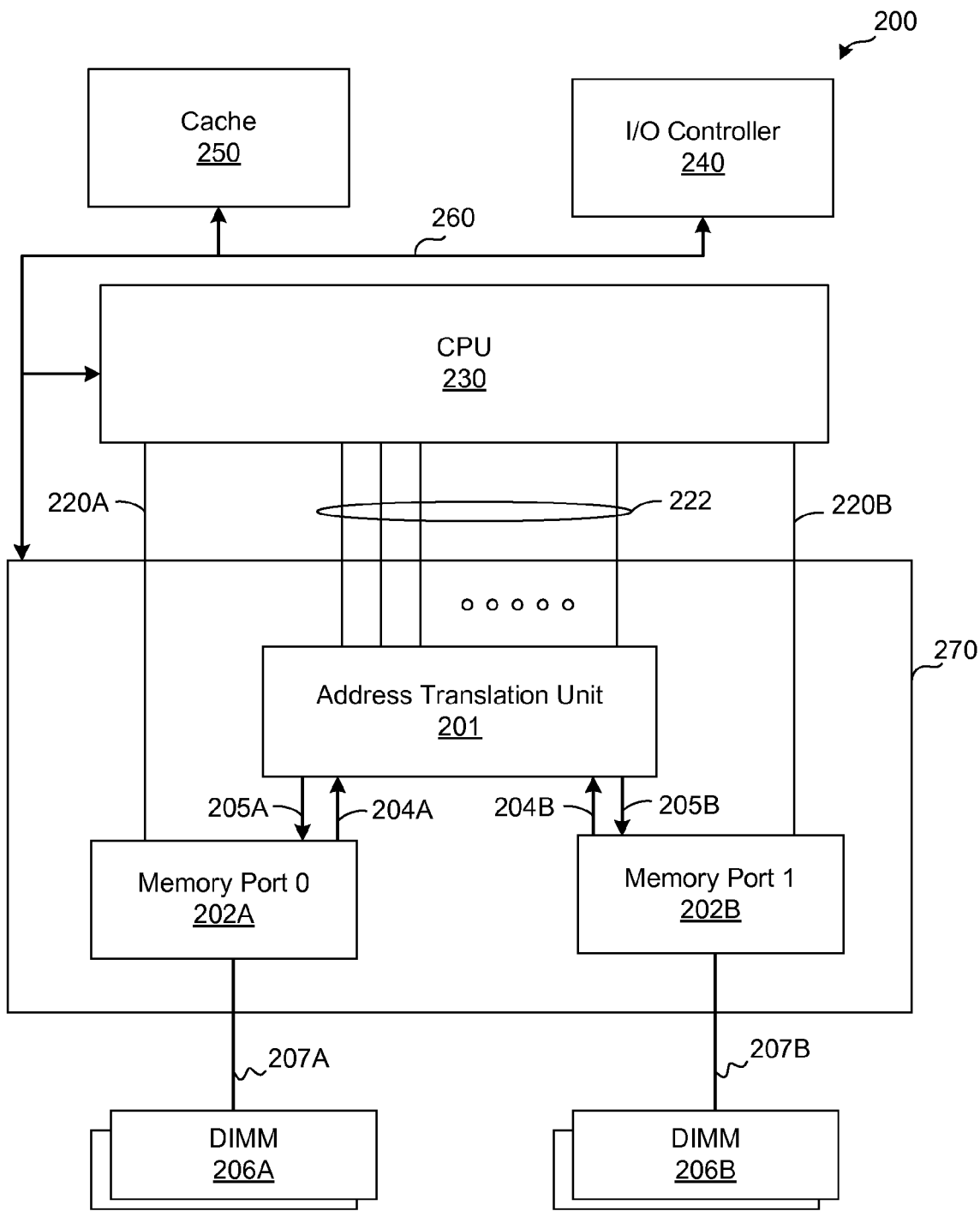
FIG. 2A illustrates an embodiment of a mirrored memory computer system implementing the process illustrated in FIG. 1 that uses the address translation unit to assign read memory commands to either of a primary or mirrored memory port.

FIG. 2A shows a high level block diagram of an embodiment of a computer system 200 implementing the process illustrated in FIG. 1. One skilled in the art will appreciate that the computer system 200 may be, for example, a mainframe computer, a server, a personal computer system, or a similar system. Moreover, those skilled in the art will appreciate that the invention may be practiced with other computer system configurations employing multiprocessor design, minicomputers, programmable electronics and the like.

Referring to FIG. 2A, shown is a computer system 200 that comprises a central processing unit (CPU) 230 coupled to a mirrored memory controller 270 having mirrored memory management and error recovery functions (not shown). Some embodiments may include error recovery functions that maintain system reliability while reducing the system bandwidth, such as that described in U.S. Patent Application Publication 2008/0052568 A1, which is herein incorporated by reference in its entirety. The computer system 200 further comprises an input/output (I/O) controller 240 and levels of memory hierarchy including a cache module 250 communicatively coupled to the CPU 230 and mirrored memory controller 270 via a system interconnect 260.

The mirrored memory controller 270 comprises an address translation unit 201 coupled to a primary memory port, hereinafter memory port 0 202A, and a mirrored memory port, hereinafter memory port 1 202B. Those skilled in the art will appreciate alternative implementations that include additional memory for increased redundancy and reliability. The address translation unit 201 takes as input a plurality of requests 222 and outputs, along a read/write command bus 205A and 205B, read and write commands. Both memory port 0 202A and memory port 1 202B queue read commands and transmit latency information to the address translation unit 201 via 204A and 204B as provided in more detail in FIG. 2B. Memory port 0 202A and memory port 1 202B communicate via a memory bus 207A and memory bus 207B respectively to a first DIMM (dual in-line memory modules) 206A and a second DIMM 206B respectively. Each DIMM is comprised of DRAM modules or similar memory modules. Memory port 0 202A and memory port 1 202B output data via data output bus 220A and 220B respectively.

Figure 2B:
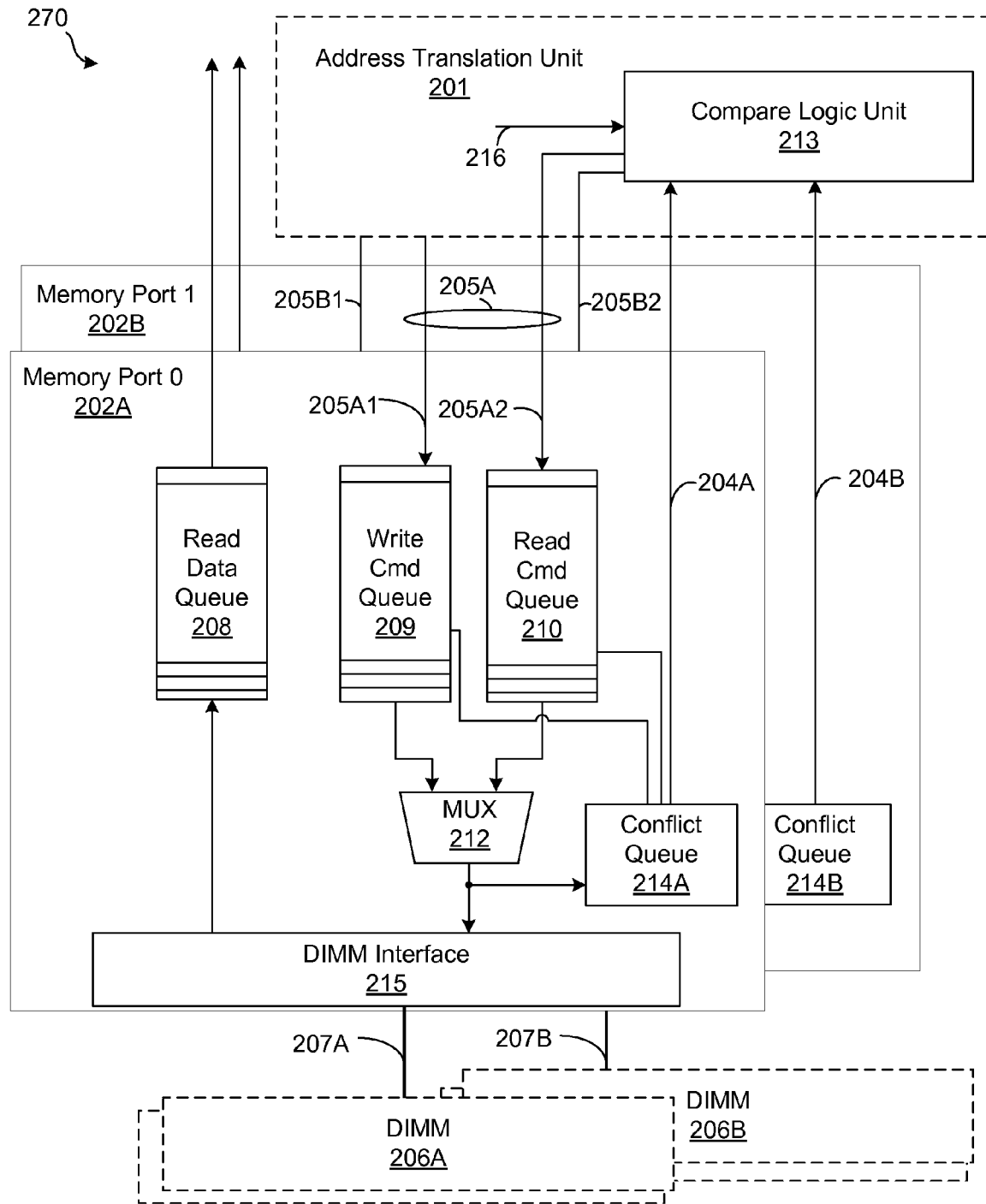
FIG. 2B illustrates a detailed embodiment of the mirrored memory computer system illustrated in FIG. 2A.

FIG. 2B illustrates a detailed embodiment of the mirrored memory controller 270 illustrated in FIG. 2A. Memory port 0 202A takes as input write commands 205A1 and read commands 205A2. A write command queue 209 and a read command queue 210 maintain read and write commands to be executed in memory. The write command queue 209 and read command queue 210 each have multiple commands to choose from and are configured to select the oldest non-conflicting command. A conflict may arise when two consecutive commands attempt to access the same section of memory, referred to as the memory bank, resulting in increased latency. Conflicts may also arise when alternating between different ranks, wherein a rank is an independently addressable 64-bit data area of a memory module, because additional clock cycles (clk(s)) are required to avoid data driver contention and also to avoid changes in On Die Termination (ODT).

A MUX (multiplexer) 212 is coupled to the write command queue 209 and read command queue 210 and alternatively selects between each queue. The MUX outputs the alternating read and write commands to the DIMM interface 215 for transmission to the first DIMM 206A via the memory bus 207A. A conflict queue 214A keeps a history of read and write commands transmitted to the first DIMM 206A. Data retrieved from the first DIMM 206A are transmitted into the DIMM interface 215 for error correction, then into a read data queue 208, and subsequently out of memory port 0 202A. Memory port 1 202B operates in a similar manner as memory port 0 202A mentioned above.

In one embodiment, the address translation unit 201 outputs a read command to either of memory port 0 202A or memory port 1 202B based on the predicted latency of each memory port as determined by the conflict queue 214A. Thus, read commands may be consecutively assigned to a primary memory port if, for example, predicted latency on the primary memory port is shorter than predicted latency on a mirrored memory port. Similarly, read commands may be consecutively assigned to the mirrored memory port.

In general, the conflict queue 214A is configured to predict latency based on various factors including memory bank and memory rank access. In a particular embodiment, the conflict queue 214A may be configured to include a list of memory access steps and related memory access times. The memory access times may be based on manufacturer specification or independent third-party benchmark as an example. Generally, memory manufacturers specify the number of memory cycles required to perform different steps in memory. For example, a memory chip may have a CAS (Column Access Strobe) of two (2), indicating that two (2) memory cycles pass between the time a column is requested from an active page and the time the data is ready to send across a bus. The conflict queue 214A may be configured to evaluate the steps required to execute a particular in-flight command (e.g., column access, row access, data access, etc.) based on memory bank location and memory rank location. Generally, bank and rank locations are embedded in the memory address associated with the in-flight command.

The total number of memory cycles associated with executing a command may vary depending on prior in-flight commands. For example, if data is active on a row as a result of a prior memory access then there is no delay in memory cycles between the time a row is activated and the time the data within the row can be requested (referred to as "tRCD" delay or "RAS to CAS" delay). Thus, if memory port 0 202A has a read command in the read command queue designated to the same row of memory as read command 216, the read command may be scheduled more efficiently because there will be no tRCD delay.

Similarly, if one of the memory ports 202A has a read command in the read command queue to the same memory rank as a read command and a different internal bank and no conflicts against commands already in-flight, the read command might be scheduled more efficiently because it can be dispatched back-to-back with no cycle gap.

Thus, the conflict queue 214A is configured to estimate the steps necessary to execute a command based on current and prior in-flight commands. A conflict queue 214B is configured to operate in a similar manner. The first conflict queue 214A and the second conflict queue 214B output predicted latency to a compare logic unit 213 located in the address translation unit 201.

Figure 2C:
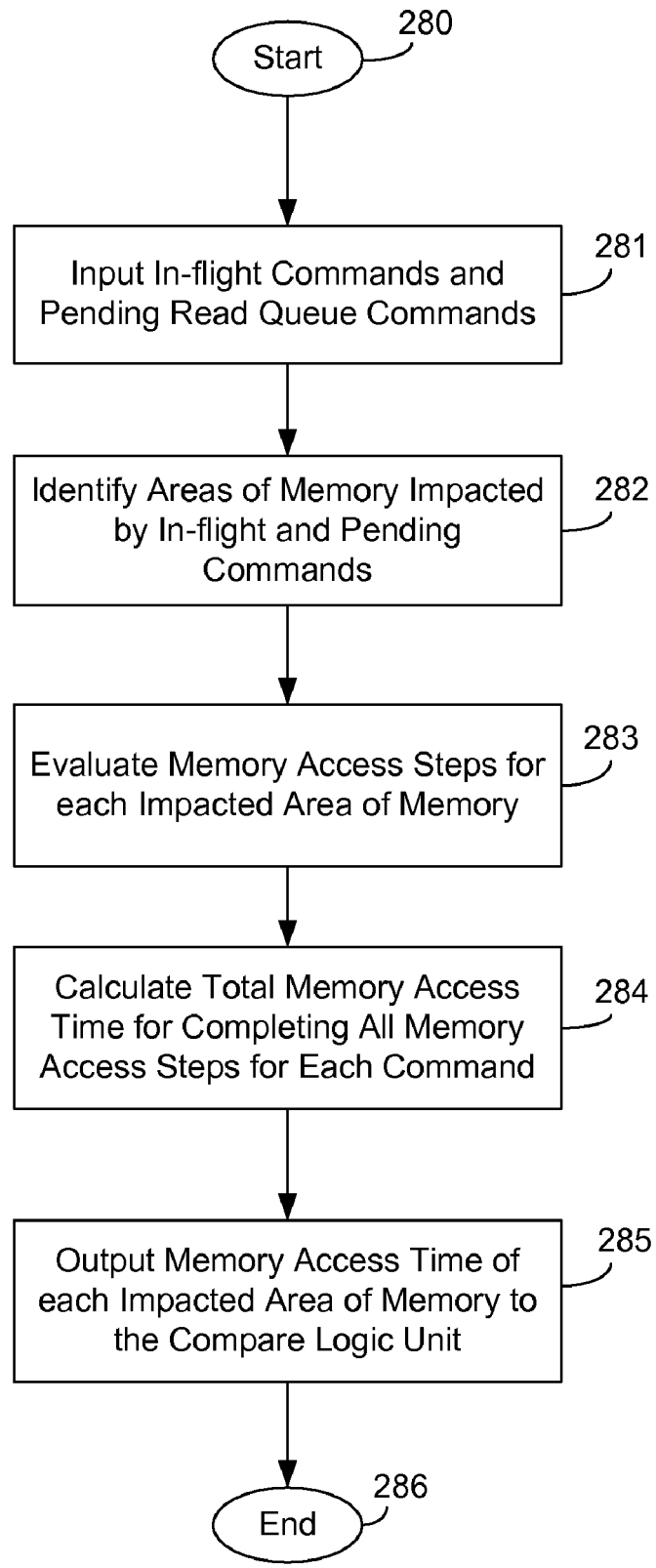
FIG. 2C illustrates one method of determining a predicted latency with the conflict queue.

FIG. 2C illustrates a flow chart overview 280 of the operation of conflict queue 214A and 214B as described in detail above. In step 281, the conflict queue takes as input in-flight commands and pending read commands. In step 282, the conflict queue identifies areas of memory that will be impacted by the in-flight and pending commands. In step 283, the conflict queue evaluates the number of memory access steps involved in accessing each area of memory impacted by the commands. In other words, the memory access steps (e.g., column access, row access, data access, etc.) needed to execute the in-flight and pending commands. In step 284, the conflict queue calculates the total memory access time to complete all memory access steps for each command. In step 285, the conflict queue outputs to the compare logic unit the memory access times (i.e., predicted latency) for each impacted area of memory.

Referring back to FIG. 2B, the compare logic unit 213 takes as input a read command 216 and compares the read command 216 to a first memory port predicted latency 204A and to a second memory port predicted latency 204B. The compare logic unit 213 outputs the read command 216 to the memory port (202A or 202B) with the shortest predicted latency, wherein shortest predicted latency depends on the area of memory impacted by read command 216.

In one embodiment, if the predicted latency for both memory port 0 202A and memory port 1 202B are equal, the compare logic unit 213 outputs the read command 216 to the read command queue with the fewest pending read commands. In an alternative embodiment, if predicted latency for both memory port 0 202A and memory port 1 202B are equal, the compare logic unit 213 alternates between each memory port.

Predicted latency may be equal if the memory address associated with read command 216 references an area of memory not impacted by in-flight commands on either of the first DIMM 206A or the second DIMM 206B. Alternatively, predicted latency may be equal if the memory address associated with read command 216 references an area of memory equally impacted by in-flight commands on both the first DIMM 206A and the second DIMM 206B. Alternatively, predicted latency may be equal if neither of the first DIMM 206A or the second DIMM 206B have in-flight commands that impact memory access times.

In an alternative embodiment, the first conflict queue 214A and second conflict queue 214B keep a history of pending read commands located in the read command queues of memory port 0 202A and memory port 1 202B in addition to in-flight read and write commands. Thus, the first conflict queue 214A and the second conflict queue 214B output the predicted latency associated with pending read queue commands in addition to the predicted latency associated with in-flight read and write commands.

In another alternative embodiment, the compare logic unit 213 keeps a history of read commands 216 assigned to memory port 0 202A or memory port 1 202B and determines potential bank conflicts between the read command 216 input to the compare logic unit 213 and the read commands in the read command queues 210 of memory port 0 202A and memory port 1 202B. If a pending read command in one of memory port 0 202A or memory port 1 202B impacts an area of memory that conflicts with an area of memory to be accessed by read command 216, the compare logic unit 213 outputs the read command to the non-conflicting memory port. Thus, the compare logic unit 213 accounts for pending read commands and in-flight read commands.

Figure 3A:
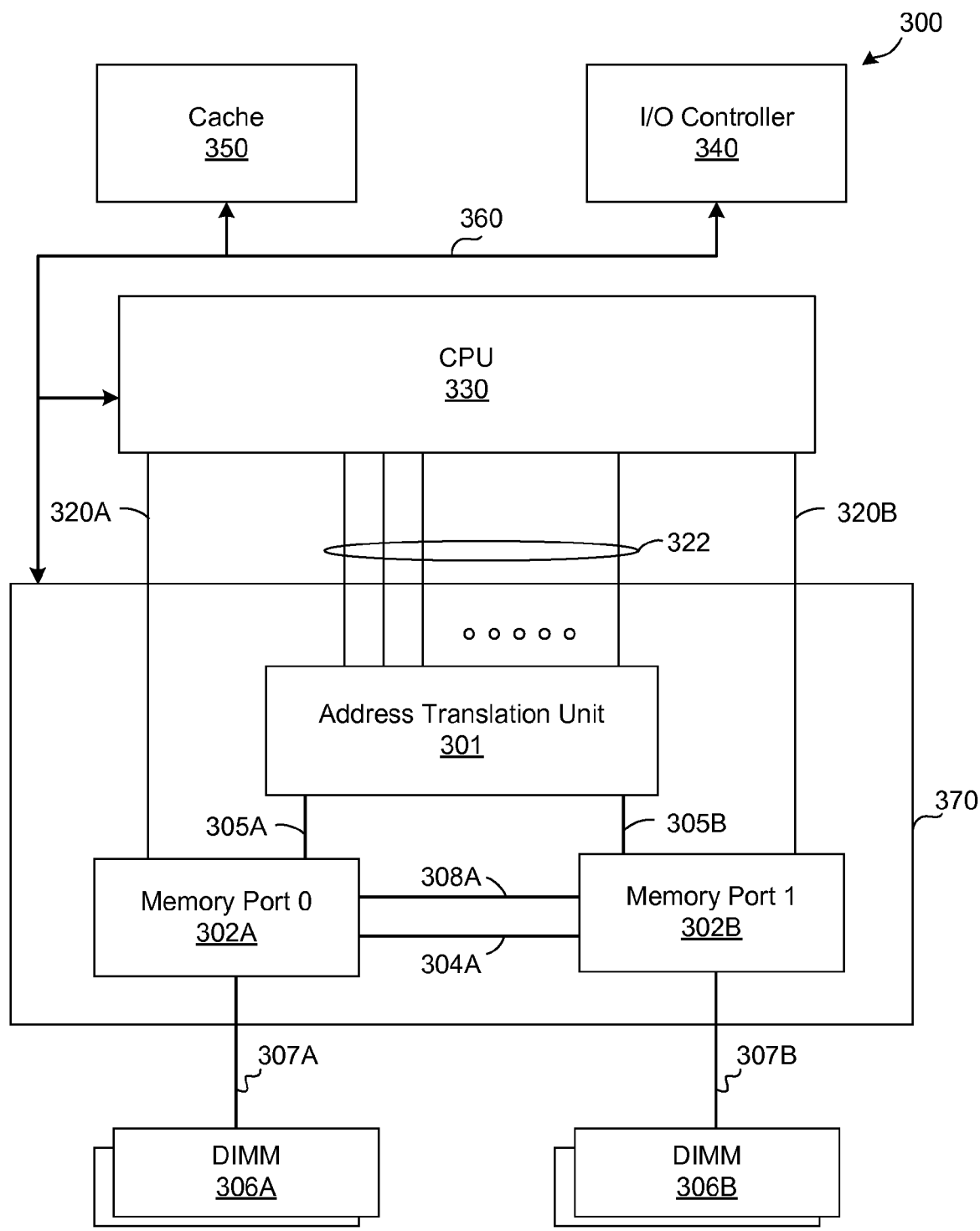
FIG. 3A illustrates a second detailed embodiment of a mirrored memory computer system implementing the process illustrated in FIG. 1 that uses a compare logic unit in a memory port to delete a duplicate read command based on a longest predicted latency.

FIG. 3A shows a high level block diagram of a second embodiment of a computer system 300 implementing the process illustrated in FIG. 1. In contrast to FIG. 2A, each memory port is interconnected for communication via 304A and 308A as explained in more detail below. Otherwise, the computer system 300 functions, in general, in a similar way to that described in FIG. 2A with an input/output controller 340 and levels of memory hierarchy including a cache module 350 communicatively coupled to a CPU 330 and a mirrored memory controller 370 via a system interconnect 360. As previously described, the computer system may be, for example, a mainframe computer, a server, a personal computer system, or a similar system with a variety of configurations including multiprocessor design, minicomputers and the like.

Referring to FIG. 3A, an address translation unit 301 is coupled to a primary memory port, hereinafter memory port 0 302A, and a mirrored memory port, hereinafter memory port 1 302A. The address translation unit 301 takes a plurality of requests 322 as input and outputs read and write commands along a read/write command bus 305A and 305B. Both memory port 0 302A and memory port 1 302B queue read commands and transmit latency information between ports as provided in more detail in FIG. 3B. Memory port 0 302A and memory port 1 302B communicate via a memory bus 307A and memory bus 307B respectively to a first DIMM (dual in-line memory modules) 306A and a second DIMM 306B respectively. Each DIMM is comprised of DRAM modules or similar memory modules. Memory port 0 302A and memory port 1 302B output data via data output bus 320A and 320B respectively.

Figure 3B:
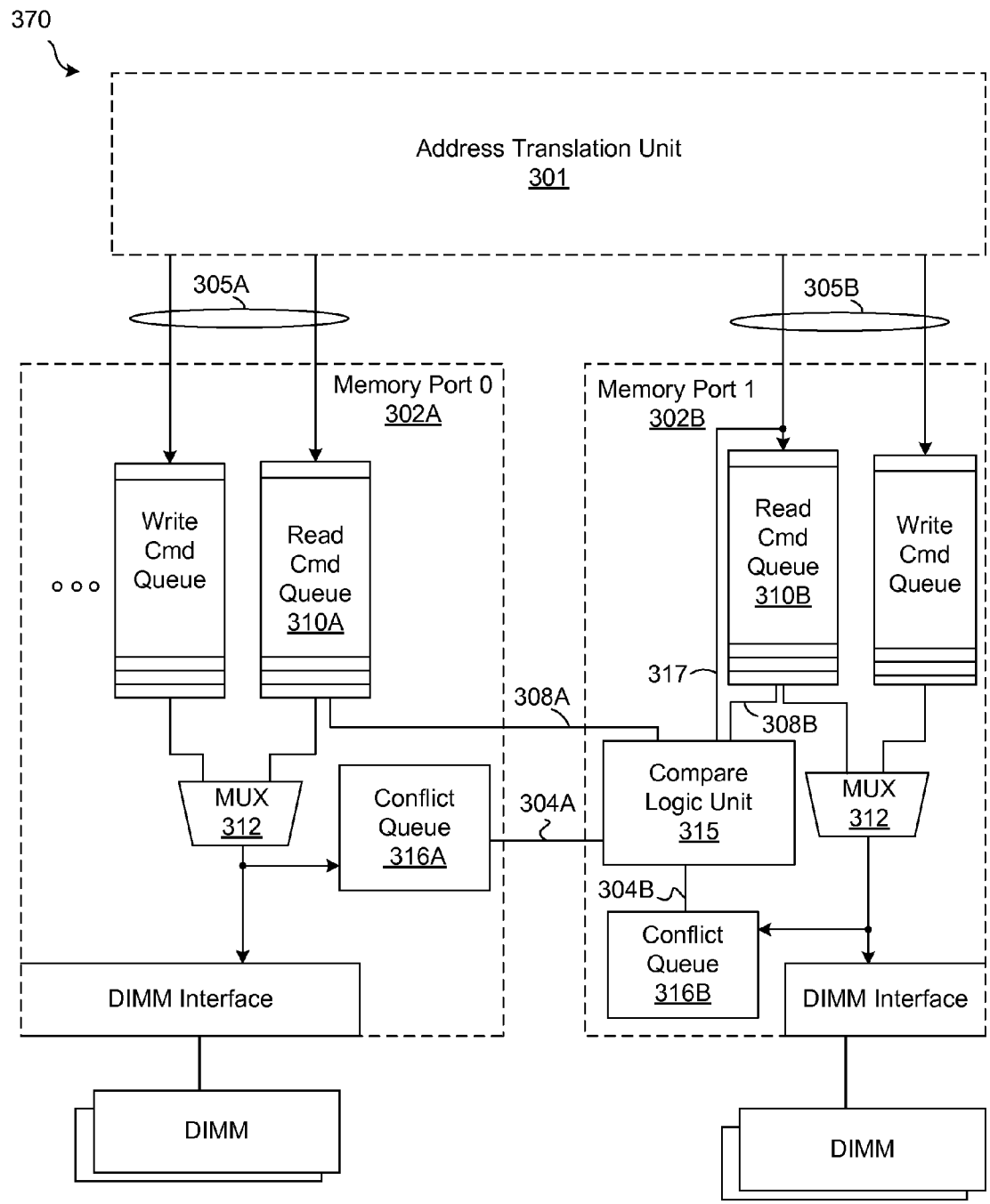
FIG. 3B illustrates a detailed embodiment of the mirrored memory computer system illustrated in FIG. 3A.

FIG. 3B illustrates a detailed embodiment of the mirrored memory controller 370 illustrated in FIG. 3A in which the address translation unit 301 transmits duplicate read commands 305 to BOTH memory port 0 302A and memory port 1 302B, unlike mirrored memory computer systems that toggle read commands between a primary memory and a mirrored memory. The first conflict queue 316A and the second conflict queue 316B keep a history of pending read commands located in the read command queues of memory port 0 302A and memory port 1 302B in addition to in-flight read and write commands. The first conflict queue 316A and the second conflict queue 316B output to a selected memory port the predicted latency associated with pending read queue commands in addition to the predicted latency associated with in-flight read and write commands. While FIG. 3B depicts the selected memory port as memory port 1 302B, those of ordinary skill in the art will appreciate that logic for scheduling read commands can be located in either of the primary (memory port 0 302A) or mirrored memory ports (memory port 1 302B). In an alternative embodiment, the compare logic unit 315 is located in between the primary memory port (memory port 0 302A) and the mirrored memory port (memory port 1 302B).

The compare logic unit 315 identifies the memory bank and rank associated with a read command 317, transmitted from the address translation unit to both read command queues, and compares a first memory port predicted latency 304A to a second memory port predicted latency 304B based on pending read queue commands and in-flight commands associated with each memory port. The compare logic unit 315 selects a memory port with a shortest predicted latency and outputs a read command delete request to a non-selected memory port via 308A or via 308B. If the predicted latency for both memory port 0 302A and memory port 1 302B are equal, the compare logic unit 315 selects a read command queue with the fewest pending read commands and sends a delete read command request to non-selected memory ports. In an alternative embodiment, if bank access times for both memory port 0 302A and memory port 1 302B are equal, the compare logic unit 315 alternates between each memory port.

Those skilled in the art will appreciate a more sophisticated memory port system with command arbitration logic that chooses not only between read and write commands but also other DRAM commands such as scrub, refresh, ZQ calibration, mirror failover read, retry read, and maintenance commands. In such a system, the compare logic unit assigns read commands to the memory port with the shortest memory bank access time as described in the embodiments above.

What is claimed is:

1. A method of scheduling read commands in a mirrored memory computer system comprising:
   determining a predicted latency for a plurality of memory ports;
   configuring an address translation unit to schedule read commands between the plurality of memory ports, and;
   scheduling a read command to one of the plurality of memory ports based on a memory port with a shortest predicted latency.

2. The method of claim 1, further comprising predicting latency for the plurality of memory ports based in part on in-flight memory commands associated with each of the plurality of memory ports.

3. The method of claim 2, further comprising configuring the mirrored memory computer system to track a plurality of pending read commands in a read command queue associated with each of the plurality of memory ports.

4. The method of claim 3, further comprising predicting latency for the plurality of memory ports based in part on the plurality of pending read commands in the read command queues associated with each of the plurality of memory ports.

5. The method of claim 1, further comprising configuring the address translation unit to schedule a read command to a read command queue with the fewest pending read commands if the predicted latency is equal among each of the plurality of memory ports.

6. The method of claim 1, further comprising configuring the address translation unit to schedule a read command to a read command queue by alternating between the plurality of memory ports if the predicted latency is equal among each of the plurality of memory ports.

7. The method of claim 1, further comprising configuring a selected memory port to handle read command scheduling between the plurality of memory ports.

8. The method of claim 7, further comprising configuring the selected memory port to schedule a read command to a memory port with the fewest pending read commands if the predicted latency is equal among each of the plurality of memory ports.

9. The method of claim 7, further comprising configuring the selected memory port to schedule a read command to the memory port by alternating between each of the plurality of memory ports if the predicted latency is equal among each of the plurality of memory ports.

10. A method of scheduling read commands in a mirrored memory computer system comprising:
scheduling a plurality of duplicate read commands to each of a plurality of memory ports;
configuring a selected memory port from among the plurality of memory ports to compare a predicted latency for each of the plurality of memory ports;
selecting a memory port with a shortest predicted latency from the plurality of memory ports; and
deleting the duplicate read commands from the plurality of memory ports not selected.

11. A structure for scheduling read commands on a mirrored memory computer system comprising:
a conflict queue configured to determine a predicted latency on each of a plurality of memory ports; and
a compare logic unit coupled to each of the conflict queues;
wherein the compare logic unit is configured to compare the predicted latency of each of the plurality of memory ports and is configured to schedule read commands to a memory port with a shortest predicted latency.

12. The structure for scheduling read commands on the mirrored memory computer system of claim 11, wherein the predicted latency of each of the plurality of memory ports is based in part on in-flight commands associated with each of the plurality of memory ports on the mirrored memory computer system.

13. The structure for scheduling read commands on the mirrored memory computer system of claim 12, wherein the predicted latency of each of the plurality of memory ports is based in part on pending commands associated with each of the plurality of memory ports on the mirrored memory computer system.

14. The structure for scheduling read commands on a mirrored memory computer system of claim 11, wherein the compare logic unit is located within an address translation unit.

15. The structure for scheduling read commands on a mirrored memory computer system of claim 11, further comprising:
an address translation unit coupled to the plurality of memory ports;
wherein the address translation unit is configured to transmit a plurality of duplicate read commands to the plurality of memory ports; and
a selected memory port chosen from one of the plurality of memory ports;
wherein the compare logic unit is located within the selected memory port.

16. The structure for scheduling read commands on a mirrored memory computer system of claim 15, wherein the compare logic is configured to schedule read commands by selecting a memory port with the shortest predicted latency and is configured to delete the duplicate read commands from the plurality of memory ports not selected.

17. The structure for scheduling read commands on a mirrored memory computer system of claim 11, wherein the compare logic unit is configured to schedule a read command to a read command queue with the fewest pending read commands if the predicted latency of each of the plurality of memory ports is equal among each of the plurality of memory ports.

18. The structure for scheduling read commands on a mirrored memory computer system of claim 11, wherein the compare logic unit is configured to schedule a read command to a read command queue by alternating between the plurality of memory ports if the predicted latency of each of the plurality of memory ports is equal among each of the plurality of memory ports.

19. A structure for scheduling read commands on a mirrored memory computer system comprising:
an address translation unit;
a primary memory port and a mirrored memory port coupled to the address translation unit;
wherein the primary memory port further comprises a first conflict queue and the mirrored memory port further comprises a second conflict queue, the first conflict queue and the second conflict queue configured to determine a predicted latency of the primary memory port and mirrored memory port respectively;
a compare logic unit coupled to the first conflict queue and to the second conflict queue;
wherein the compare logic unit is configured to compare a predicted latency on the primary memory port and mirrored memory port and is configured to schedule read commands to a memory port with a shortest predicted latency.

\* \* \* \* \*